Dec. 8, 1964 N. M. BARLOW ETAL 3,160,540
METHOD OF APPLYING SNAP FASTENERS TO ARTICLES OF MANUFACTURE
Original Filed Oct. 21, 1958 7 Sheets-Sheet 3

INVENTORS:
NORMAN M. BARLOW,
EVERETT MELANSON,
BY Walter S. Jones
ATTORNEY.

INVENTORS:
NORMAN M. BARLOW,
EVERETT MELANSON,
BY Walter S. Jones
ATTORNEY.

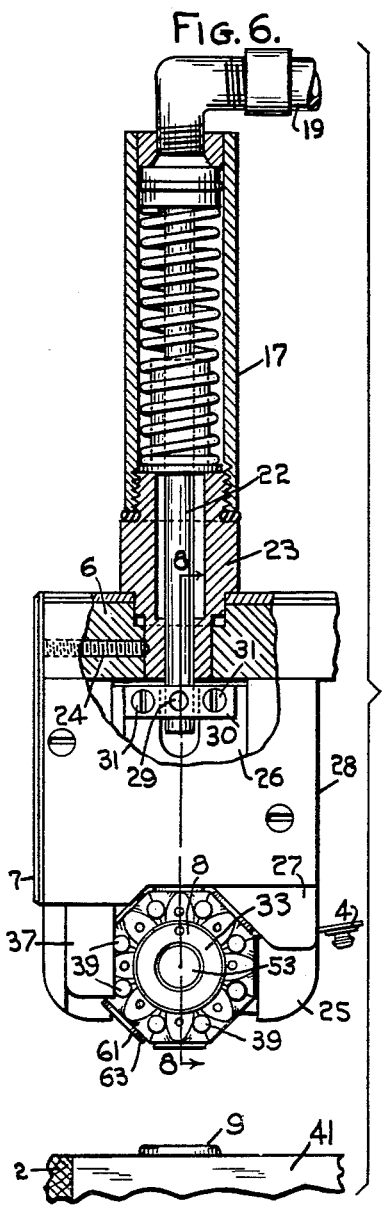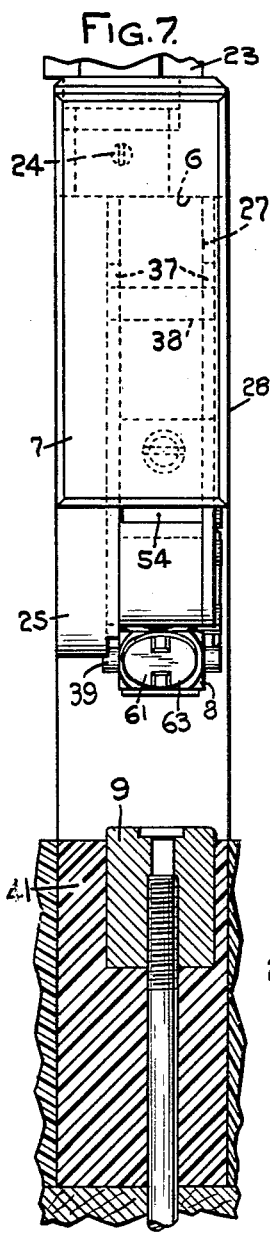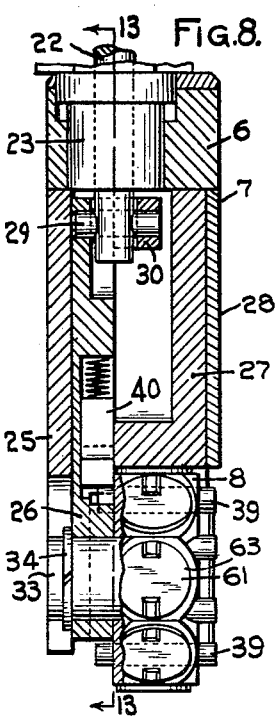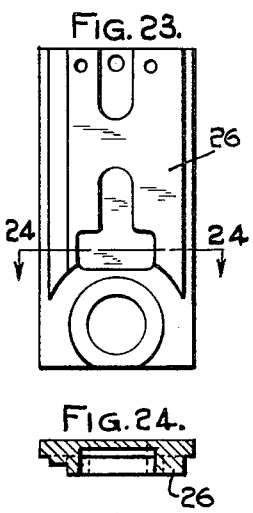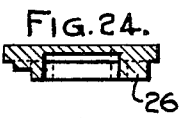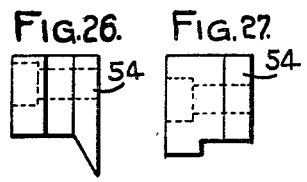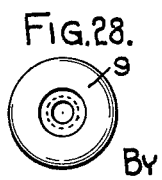

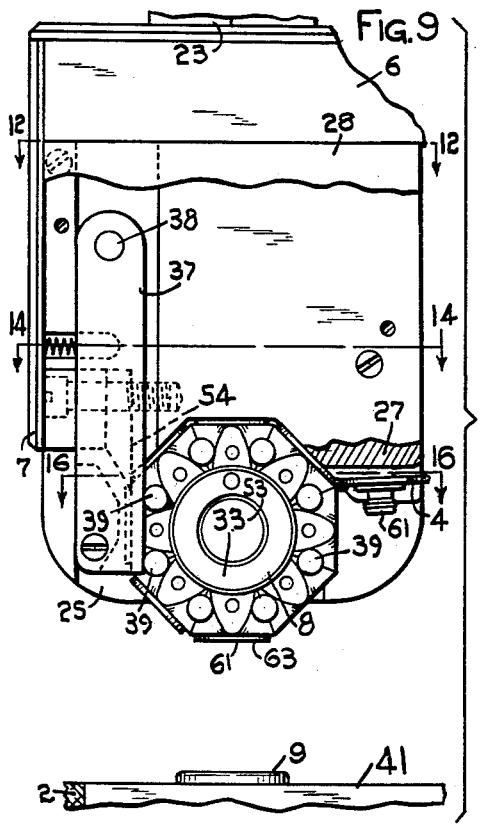
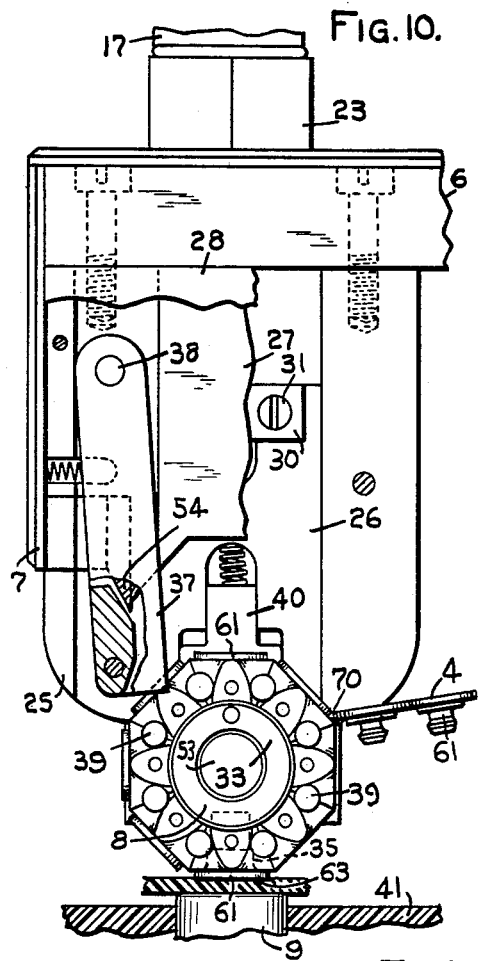
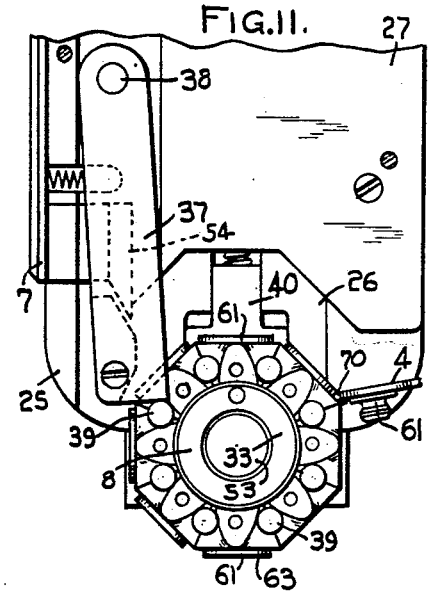
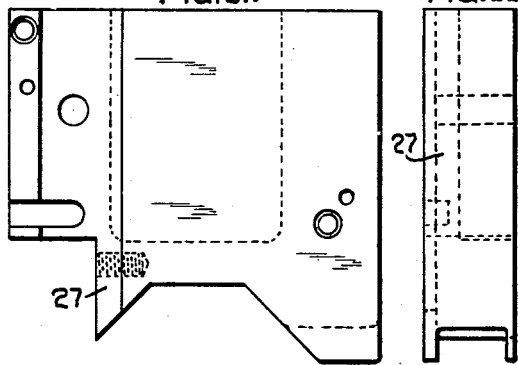

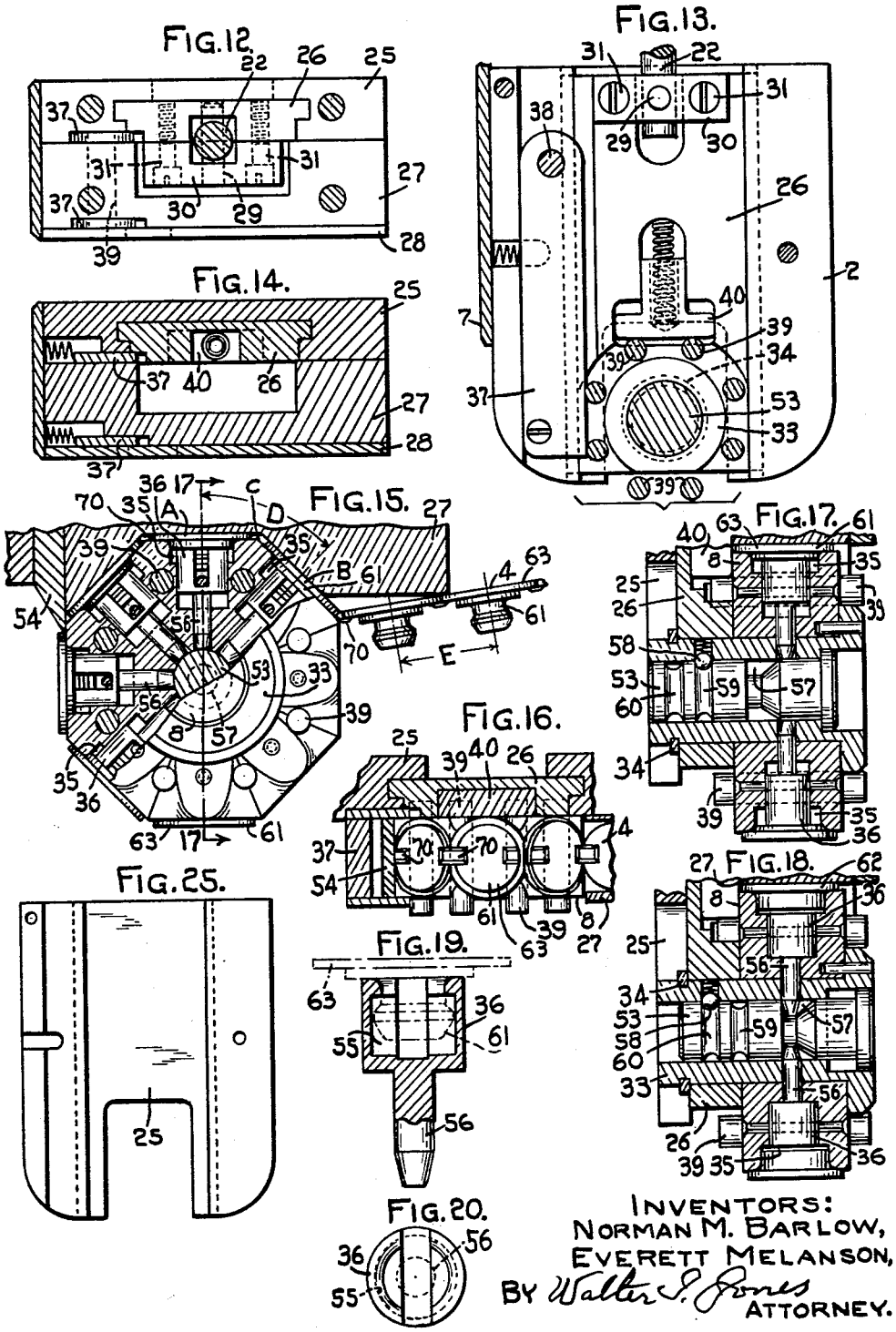

United States Patent Office 3,160,540
Patented Dec. 8, 1964

3,160,540
METHOD OF APPLYING SNAP FASTENERS TO ARTICLES OF MANUFACTURE
Norman M. Barlow, Natick, and Everett Melanson, Wakefield, Mass., assignors to United-Carr Incorporated, a corporation of Delaware
Original application Oct. 21, 1958, Ser. No. 768,760, now Patent No. 3,049,462, dated Aug. 14, 1962. Divided and this application Dec. 9, 1959, Ser. No. 858,486
1 Claim. (Cl. 156—66)

Our invention aims to provide improvements in the method of applying snap fastener elements (preferably constructed of so-called plastic or at least having a plastic base) to any suitable supporting member. It also provides new and useful apparatus for attaching such fasteners, preferably by the use of a high frequency generator as part of the apparatus, whereby the elements may be heat sealed to the suitable supporting member.

This application is a division of our application, Serial No. 768,760, filed October 21, 1958, now U.S. Patent No. 3,049,462.

An object of our invention is to make plastic snap fasteners, as individual units such as studs and sockets, put the studs or sockets together in strip form, feed the strips to a fastener attaching apparatus and then separate the snap fastener members, one or more at a time, from the strip and then apply them to the supporting structure by a new, simple apparatus, preferably by the use of electrically supplied heat sealing energy.

A further object of our invention is to provide an improved and useful apparatus that will apply at least one plastic snap fastener to a suitable support at a faster speed than heretofore possible.

A further object of our invention is to feed a strip of fasteners, regardless of the method of manufacture, to a suitable apparatus operable to pull the fasteners apart and then heat seal them to a suitable supporting material.

A further object of our invention is to provide an improved apparatus that is simple in construction, positive in operation and provided with fastener holding and attaching tools that may be easily and quickly operated to switch from a stud, to a socket attaching means so that one complete machine may attach either studs or sockets as desired.

A further object of our invention is to provide a simple complete machine that needs only to be plugged into an electric current supply to be completely operable as a fastener attaching machine operable partly by compressed air and partly by an electric heat-sealing generator to attach either part of a snap fastener member as desired, it being only necessary to supply the machine with a roll of snap fastener studs or a roll of snap fastener sockets and make a tool applying adjustment to certain parts of the machine.

Another object of our invention is to provide new and useful methods of applying snap fasteners to suitable supporting materials.

Referring now to the drawings, we have illustrated our invention in part as complete devices and in part by schematic showings where it is unnecessary to disclose certain elements which will be well known to those skilled in the art, the detailed disclosures of which would merely complicate the drawings:

FIG. 6 is a side elevation, partly in section, of an attaching head of the machine shown in FIG. 1;

FIG. 7 is an enlarged front elevation, partly in section, of a portion of the attaching head shown in FIG 6;

FIG. 8 is an enlarged section, partly in elevation, taken on the line 8—8 of FIG. 6;

FIG. 9 is a side elevation, with parts broken away, of a portion of the head mechanism shown in FIG. 6;

FIG. 10 is a view similar to FIG 9 with other parts broken away and parts moved to a fastener attaching position;

FIG. 11 is a view of the upper portion of the head shown in FIGS. 9 and 10 in retracted position from the position shown in FIG. 10;

FIG. 12 is a section taken on the line 12—12 of FIG 9;

FIG. 13 is a section taken on the line 13—13 of FIG. 8;

FIG. 14 is a section taken on the line 14—14 of FIG. 9;

FIG. 15 is an enlarged sectional view, with parts in elevation, showing the fastener attaching carrier and associated fasteners;

FIG. 16 is a section taken on the line 16—16 of FIG. 9;

FIG. 17 is a section taken on the line 17—17 of FIG. 15 showing the positions of the parts of the device shown in FIG. 15 for applying the stud member of the fastener;

FIG. 18 is a section showing the normal positions of the parts of the device, shown in FIG. 15 to attach the socket member of the snap fastener;

FIG. 19 is a sectional view of a stud holder with a stud shown in dotted lines;

FIG. 20 is a plan view of a stud holder as shown in FIG. 19 without the stud;

FIG. 21 is a side view of one of the guide plates of the upper head attaching mechanism;

FIG. 22 is an edge view of the guide plate shown in FIG. 21 as viewed from the right hand side;

FIG. 23 is a side elevation of a slide plate forming part of the upper attaching head;

FIG. 24 is a section taken on the line 24—24 of FIG. 23;

FIG. 25 is a side elevation of a second guide plate forming a part of the upper head of the attaching machine and cooperating with the slide shown in FIG 23;

FIG. 26 is a side view of the cutter shown in FIG. 9;

FIG. 27 is a plan view of the cutter shown in FIG. 26;

FIG. 28 is a plan view of the lower heat sealing tool of the attaching head;

FIG. 31 is a plan view of a portion of a strip of snap fastener studs as viewed from the base side;

FIG. 32 is a side elevation of the strip of snap fastener studs shown in FIG. 31;

FIG. 33 is a plan view from the flange side of a portion of a strip of snap fastener socket members;

FIG. 34 is a side elevation of a fastener socket strip shown in FIG. 33 with one socket shown in section.

Figure 1:
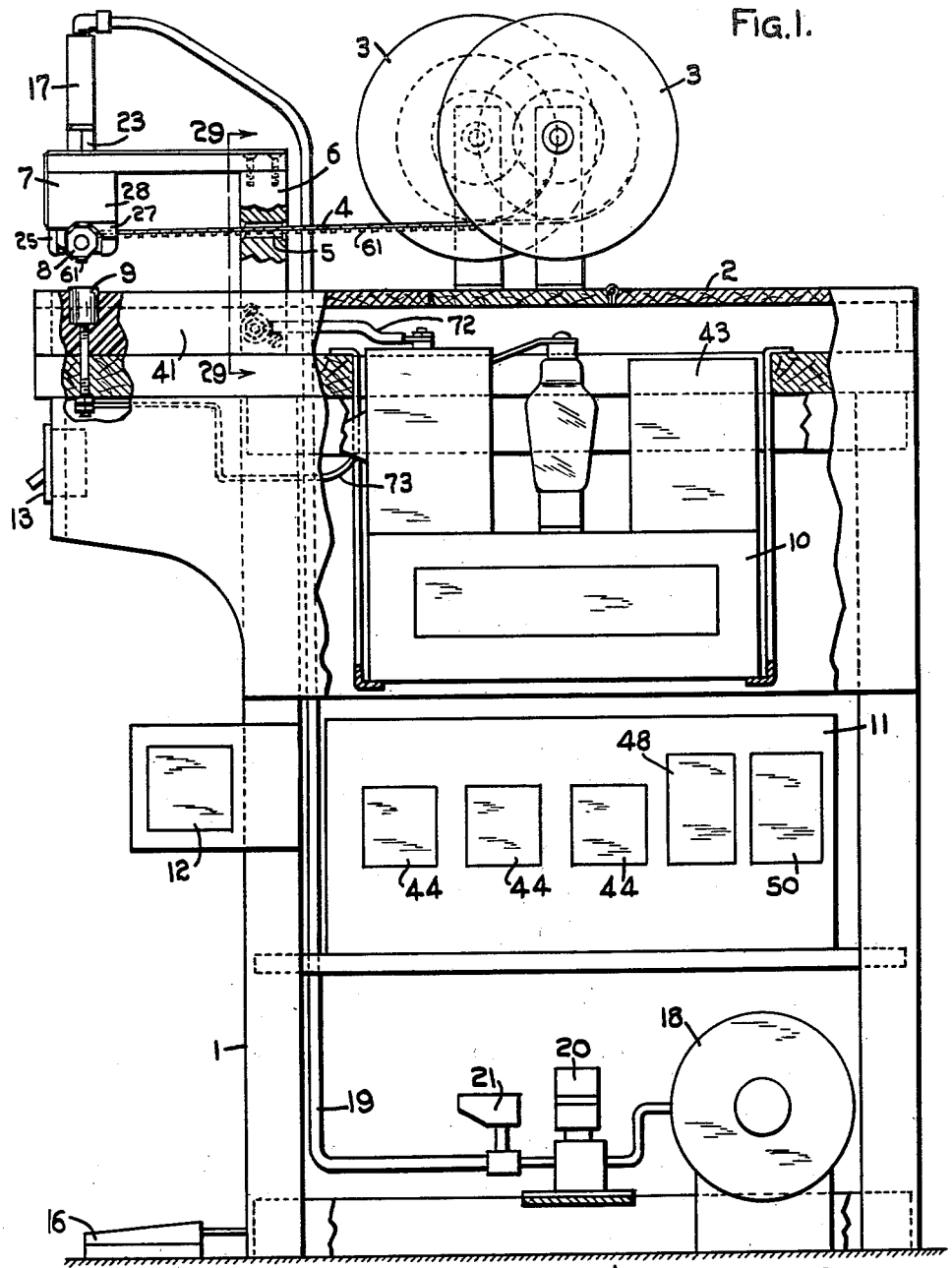
FIG. 1 is a side view, partly in section, partly broken away and partly schematic of an attaching machine showing one form of our invention.

Applicants' invention, as illustrated in the drawings and set forth in the annexed claim, is a result of their being confronted with the problem of attaching snap fasteners (previously formed from plastic such as so-called vinyl plastic) to various articles, preferably by heat sealing methods and mechanisms for performing the desired result.

The methods and apparatus to be described have been perfected and found satisfactory. These methods and a preferred form of attaching apparatus will be described, but in some instances, as will be understood by those skilled in the art, parts of the apparatus are shown sketchily because detailed disclosures and descriptions will be superfluous to those skilled in the art.

Referring now to the drawings, we have shown an apparatus for attaching plastic snap fastener socket and stud parts to any suitable material. The attaching apparatus may take various forms depending upon the application of the snap fasteners. In the specific apparatus illustrated we have shown a three-headed attaching machine (FIGS. 1 and 2) useful in attaching either sockets or studs as desired to an article such as baby pants, which may be of plastic material, woven cloth, or a combination of both. Thus, we can apply three sockets at a time to an edge of a pants opening and then, as desired, three studs to the opposite edge.

We have shown our apparatus as assembled within and on a stand 1 in cabinet-like form (FIG. 1). On the top 2 of the stand 1 we have mounted reels 3 of snap fastener studs or sockets in continuous strips 4. These strips 4 are passed through holes 5 in brackets 6 and then to upper attaching heads 7 having rotating portions 8. The construction and operation of those upper attaching heads will be more specifically hereinafter described.

Our apparatus also includes a lower attaching tool 9 supported in the top 2 of the stand as will be hereinafter described.

Figure 2:
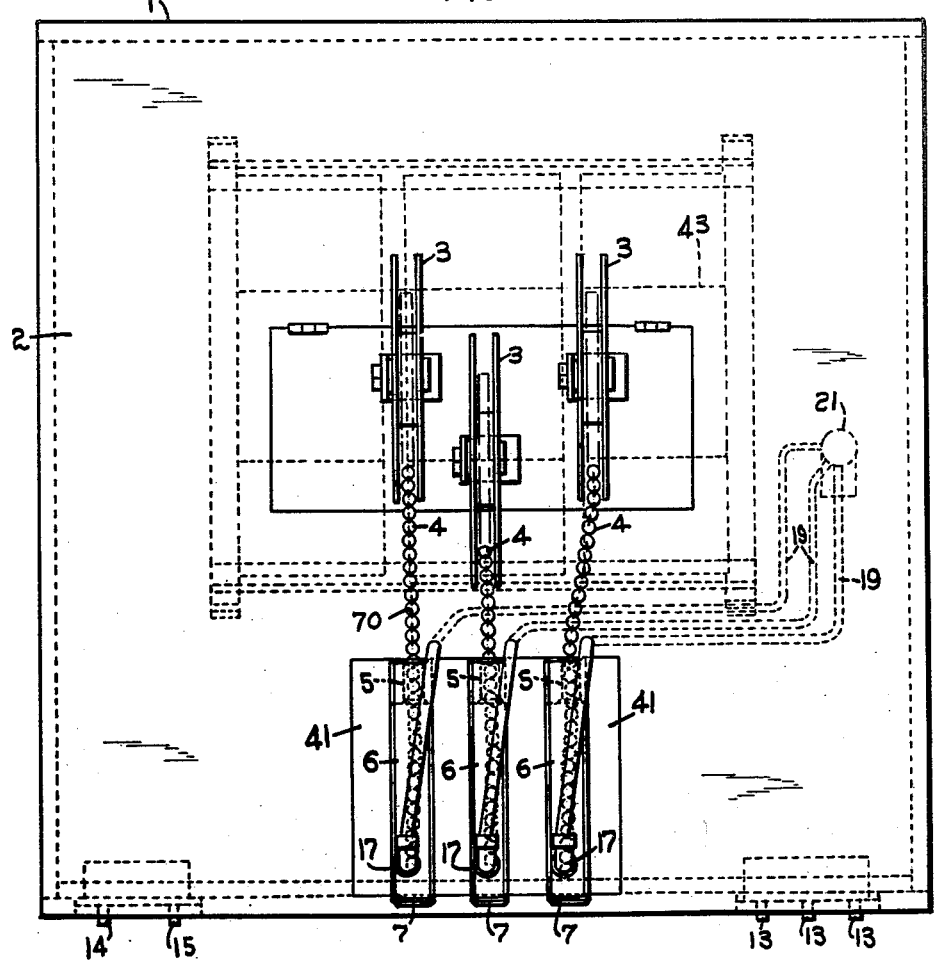
FIG. 2 is a plan view of the machine shown in FIG. 1 showing a three headed machine with some parts shown in dotted lines.

Our apparatus includes a so-called high frequency generator 10 suitably mounted within the stand 1. It also includes a main control panel 11, a main timer 12, hand-operated switches 13 for controlling the operation of the heads of the machine. There is also included in the electrical part of the machine a main switch 14, FIG. 2, and a heat control switch 15. It will also be noted that all three of the switches 13 for controlling the three heads of the machine are shown in FIG. 2.

In FIG. 1 we have shown a foot-operated switch 16 whereby the operator of the equipment may operate it by the use of the foot while handling the garment between the upper and lower heads and attaching tools and while the operator is in a seated position.

With our piece of attaching apparatus it is necessary to move the three upper attaching heads downwardly toward the lower attaching tools 9 during attaching of the snap fastener members to the baby pants or other garment. This movement may be accomplished in various ways by different mechanisms but we have preferred to operate them by means of air cylinders 17, FIGS. 1 and 2. While these air cylinders may be operated from any source of compressed air, we supply an air compressor 18 (FIG. 1) in the bottom of the stand 1, and this is connected by any suitable piping 19 to the air cylinders 17. In order to maintain the proper air pressure, we have provided a main air solenoid valve 20 and an air pressure switch 21 all as shown in the lower part of FIG. 1.

To this point we have described in a general manner the parts and setup of our preferred attaching equipment which comprises a single unit or multiple units which may be easily moved from place to place and be ready for operation merely by plugging the apparatus into any suitable electrical supply outlet.

While it should be understood that a plastic socket or a plastic stud may be heat sealed to a suitable article of commerce such as a baby pants by attaching tools constructed and operating in any suitable manner, we have provided a simple and efficiently operating upper attaching head which receives the strip 4 of fastener members and is so constructed and operated that it will separate a fastener member from the strip and apply it automatically to the baby pants and then so operate that it is ready to apply the next fastener from the strip. This upper head apparatus is shown in FIGS. 6 through 18 inclusive and certain detailed parts of this construction are shown in FIGS. 21 through 30 inclusive. In describing the upper attaching head 7 which is supported by the bracket 6, we will include the air cylinder 17 as a part of the head. This air cylinder 17 receives compressed air through the pipe 19 and operates to move a rod 22 in the usual manner of any well known air cylinder, and therefore, while we have shown some of the details of the cylinder, it is unnecessary to explain them.

The fastener applying movable head 8 is attached to the rod 22 that reciprocates in a bushing 23 held in the bracket 6 by a set screw 24 (FIG. 6). This head is made up of one guide plate 25 (FIGS. 6, 12 and 25), a slide plate 26 (FIGS. 6, 12, 23, and 24) and a second plate 27 (FIGS. 6, 12, 21 and 22) and a cover plate 28 forming a unit.

The slide plate 26 is attached to the rod 22 by a pivot 29 (FIG. 6) through a block 30 attached to the slide plate 26 by screws 31 (FIGS. 6, 12 and 13).

The head also includes the rotating fastener feeding and applying member 8 (FIG. 6) mounted on a hollow shaft 33 integral with the member 8 and mounted in the slide 26, as best shown in FIGS. 8 and 17, and held in place by a split ring 34.

The rotating member 8 has a suitable number of radial bores 35 in each of which is a slidably mounted member 36 cooperating with other operating means to be described hereafter. These bores 35 are adapted to receive either the stud or socket members as desired.

Any suitable mechanism can be used to rotate the rotating member 8, but we prefer to rotate it by means of a pawl 37 mounted on a pivot 38 supported by the plates 25 and 27 (FIGS. 9 and 12) which operates upon pins 39 spaced around the outer face of the rotating member 8. The rotating member 8 is held in a given position when applying a snap fastener member by means of a spring pressed plunger 40 (FIGS. 11 and 13) bearing upon two of the pins 39.

The lower attaching tool 9 (FIGS. 1 and 7) is supported in the lower part 41 of the bracket 6 and at least the lower part 41 is formed of insulating material since the tool 9 forms an electrode as will be described hereafter. This tool 9 supports the baby pants or the like and is in alignment with a bore of the rotating member 8 during the fastener attaching operation, as best shown in FIG. 10.

Figure 5:
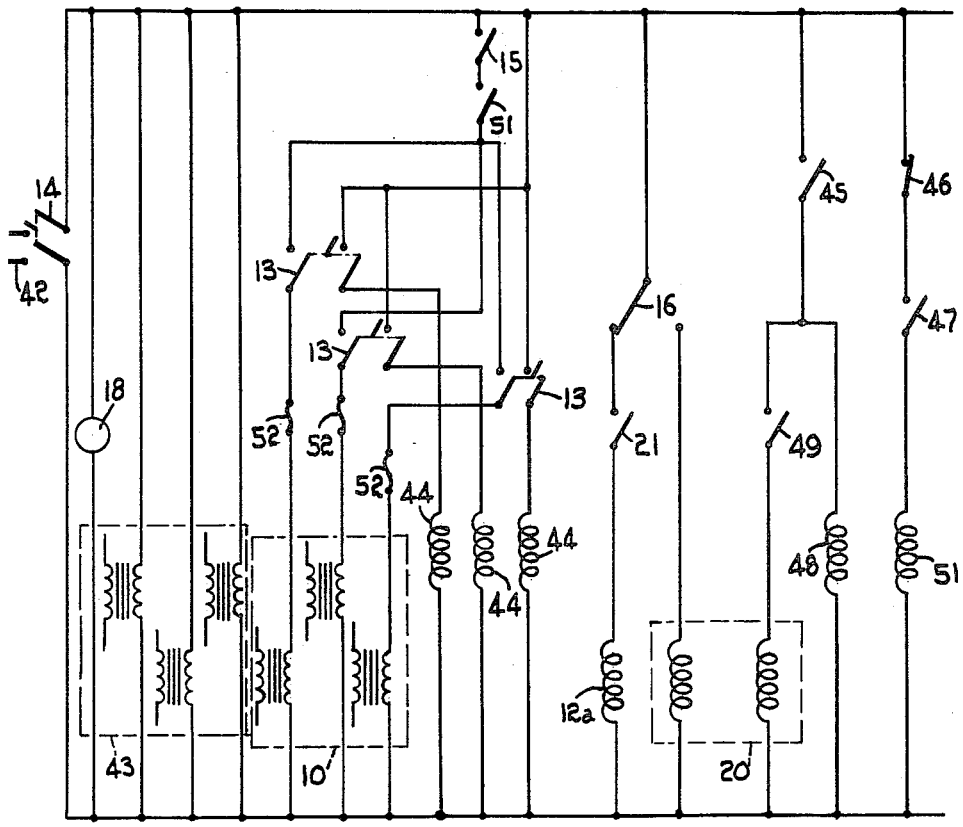
FIG. 5 is a wiring diagram of the electrical apparatus used in conjunction with our attaching machine.
Figure 29:
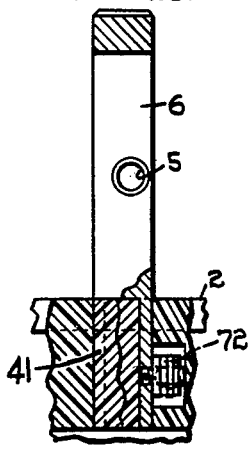
FIG. 29 is an enlarged section taken on the line 29—29 of FIG. 1.
Figure 30:
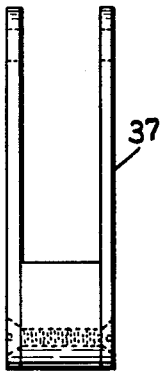
FIG. 30 is a front elevational view of the rotating pawl forming a part of the upper head.
Figure 35:
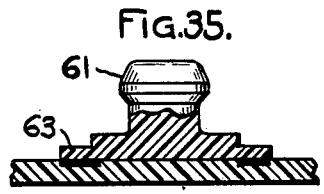
FIG. 35 is an enlarged sectional view showing the complete heat sealed attachment of a snap fastener part to a supporting member.

Referring now to the electrical parts of the fastener attaching apparatus shown by the wiring diagram of FIG. 5, we have illustrated one specific combination of the devices for operation with the mechanical parts of the apparatus, this diagram covers a machine for attaching three fastener parts at a time and therefore, it should be understood that the electrical equipment will vary according to the desired type of machine. It should also be understood that we realize that the circuit may vary according to the requirements for the heat sealing of a fastener member to a given supporting material.

The diagram of FIG. 5 shows a suitable power supply 42 connected to the main switch 14. There is also shown a so-called manually operated heat control switch 15 connected in the circuit between the power supply and the high frequency generator 10.

The high frequency generator 10 includes the three transformer symbols shown enclosed by dotted lines and marked with the numeral 10. The reason for showing three transformer symbols is because we prefer to have a separate unit controlling the high frequency power to each of the three heads 7 and lower tools 9 of the attaching equipment. There are also shown three transformer symbols enclosed by dotted lines and numbered 43 and these supply the power to the usual oscillating tube filaments (not shown).

The three hand-operated switches 13 are located in the circuit supplying power to the high frequency generator (or generators) so that they may control supply of high frequency power to all of the attaching heads or to any number of those heads depending upon the operation desired.

An air compressor 18 is shown as connected into the main power supply and its operation continues to build up a supply of compressed air so long as the main switch 14 is closed. The compressor 18 supplies air to the air actuated cylinders 17 and the supply of air to these cylinders is controlled by the main air solenoid valve 20 shown enclosed by dotted lines carrying the numeral 20. In order that we may have individual control of a machine having multiple attaching heads we provide the circuit with three other air solenoid valves 44.

It is important to control the length of the time of application of high frequency power at the electrodes when the snap fastener is applied to its support because different sealing conditions arise in connection with different types of applications. To provide the high frequency control time we have used in the circuit a main timer 12 indicated in the circuit by the relay coil 12a. It should be understood that we have not shown all of the symbols of the main timer mechanism at 12a because the construction and operation of such a device is well known to those skilled in the art. However, we have shown three contacts 45, 46 and 47 in various parts of the diagram but which are actually part of the main timer 12 (FIG. 1) the purposes of which will be more fully described hereafter.

We have also illustrated a time delay timer 48 operating in the circuit to maintain the electrodes of the attaching head or heads in contact with the work during the sealing operation. This provides a short period of time, after the high frequency power is turned off the electrodes, so that the heat sealed joint may cool before the pressure of the electrodes on the work is released. A contact 49 (actually part of the time delay timer 48) is also shown in the circuit (FIG. 5).

We have provided a foot operated switch 16 (which could just as well be hand operated) because it is easy for the operator to use while his or her hands are busy holding the work. This switch 16 when operated causes actuation of the main solenoid valve 20 which in turn closes the air pressure switch 21 and energizes the relay coil 12a and which in turn energizes a mercury relay 50. This mercury relay 50 causes operation of a mercury contact 51 (actually a part of the relay 50 but shown separated therefrom in the diagram for convenience).

Three fuses 52 are shown in the power supply lines to the high frequency generators for the usual protection.

It should be understood that the circuit disclosed in FIG. 5 is laid out for convenience and that some symbols that should form parts of the various electrical devices have been omitted (such as tubes, internal wiring of the high frequency generators and the wiring diagram of the main timer, etc.), because to add them would create confusion in the disclosure. These omitted symbols are unnecessary because any person skilled in the art will understand what is required from the description of the complete cycle of the equipment which follows later in the specification.

While the apparatus we have been describing may be arranged to attach either snap fastener studs or snap fastener sockets, we prefer to provide means whereby the same equipment may be easily switched from one to the other so that a single piece of apparatus will provide a manufacturer with all he needs to apply both parts of a desired snap fastener.

In the apparatus illustrated by the drawings we have incorporated in each rotor 8 an axially sliding pin 53 (FIGS. 17 and 18) cooperating with stud holders 36 slidably mounted in the radial bores 35. Each stud holder (FIGS. 17, 18 and 19) has a stud receiving bore 55 and a pin-like contacting shank 56. These shanks 56 engage in a groove 57 in the pin 53 (FIG. 18) when out of stud-receiving position (socket receiving positions) and are engaged with the outer surface of the pin (FIG. 17) when in stud-receiving position.

The operating pin 53 is held in either of the two positions just mentioned by a spring-pressed ball 58 cooperating with grooves 59 and 60 in the pin 53 as best shown in FIGS. 17 and 18. Therefore, when the pin 53 is moved to the position shown in FIG. 17, the stud holders 36 are moved radially outwardly and snap fastener sockets cannot be fed through the machine because these holders prevent portions of the sockets from entering the radial bores 35. However, the stud heads of the snap fastener studs may enter into the bores 55 provided in the stud holders 36 and thus be carried around by the rotor 8 into applying positions.

When the pin 53 is in the position shown in FIG. 18, the stud holders 36 may be moved radially inwardly thereby exposing the upper ends of the bores 35 and admitting portions of the sockets so that they may be rotated into applying positions by the rotor 8.

While we have illustrated and described apparatus that might be used to apply various types of snap fastener studs and sockets, we prefer to use the apparatus to apply snap fastener studs 61 and sockets 62, preferably made of heat sealable plastic materials. These may be fed individually to the apparatus, but we prefer to feed them in strip form so that the feeding means may be very simple in construction and the fasteners therefore may be supplied on reels 3.

A preferred form of strip is shown by FIGS. 31 and 32 whereby the studs 61 have flanges 63 that may be heat sealed together in edge to edge contact. The sockets 62 are also best sealed together in the same manner as shown in FIGS. 33 and 34.

Figure 3:
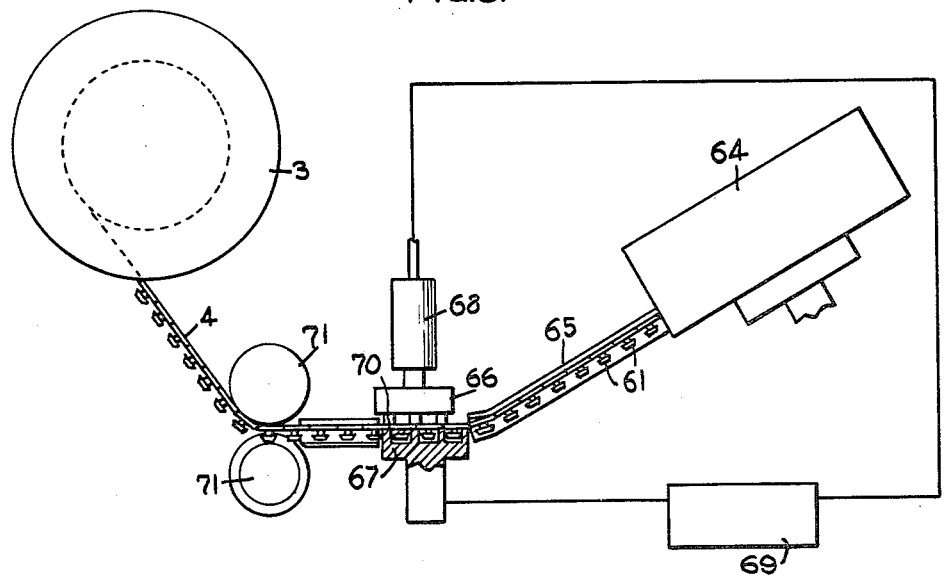
FIG. 3 is a more or less schematic side view of an apparatus for assembling the snap fastener members in strip form.
Figure 4:
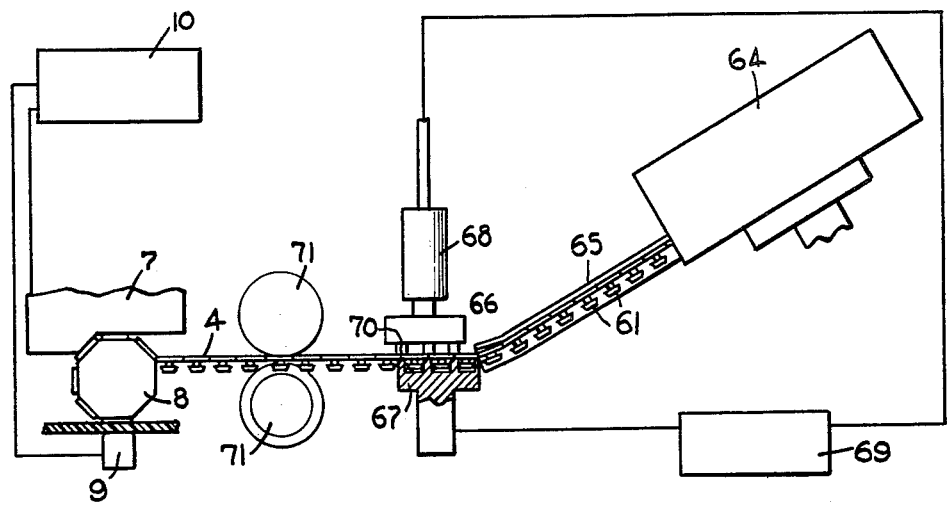
FIG. 4 is a more or less schematic view in side elevation showing an apparatus for assembly of the fasteners into strip form and feeding them directly to an apparatus for attaching the fasteners to a supporting member.

Our improved methods of making the fastener strips and supplying the fasteners to the attaching apparatus are best shown in FIGS. 3 and 4.

In FIG. 3 we have shown, in a schematic manner, a method which includes providing a hopper 64 into which individual snap fastener studs 61 or sockets 62 are placed and suitably fed down a track 65 to heat sealing electrodes 66 and 67. Any suitable means may be used to operate the electrodes for the heat sealing operation, as by an air cylinder 68 and a high frequency generator 69. As the stud 61 passed through the heat sealing electrodes their flanges 63 are in edge to edge contact and the electrodes are shaped to heat seal the edges together and form connections 70 as best shown in FIG. 31. Two or more stud flanges 63 may be sealed in each operation of the electrodes and they may be sealed as a continuing or intermittent operation as will be understood by those skilled in the art.

Thereafter the continuous strip of fasteners is fed through rollers 71 to a driven reel 3 as illustrated.

If desirable, the mechanism for feeding and heat sealing the fastener members in edge to edge contact may be associated directly with our apparatus heretofore described and the strip fed directly to the rotor 8 (or rotors) as shown by FIG. 4. Thus we have provided new, useful and simple methods and mechanisms for assembling the fastener members into strips and then feeding these strips to apparatus that will separate them and attach them to suitable supporting materials preferably by high frequency heat sealing power.

Now that most of the details of the construction of the apparatus have been described we will proceed to explain the operation of our equipment during a complete cycle of the same.

The operator first snaps on the main switch 14 connected to the main electric power supply, then snaps on the heat control switch 15 and finally the switch or switches 13 thereby preparing the apparatus for operation. The air compressor 18 is now in operation. The filament circuits of the oscillator tubes of the high frequency generator are now energized.

The operator now inserts the work, to which fasteners are to be applied, between the upper attaching head or heads 7 and the lower attaching tool or tools 9. Then the operator steps on the foot switch 16 thereby causing power to flow to the open coil of the main air solenoid valve 20. The valve 20 admits air through the suitable piping 19 to the air cylinders 17 of the upper attaching heads 7. The air pressure then forces the rods 22 downwardly thereby pushing the rotating portions of the heads toward the work.

Since the strip of fasteners 4 previously has been threaded into the rotating head portion 8 and the head has been operated sufficient times to separate a fastener member from the strip and locate it in a bore 35 in alignment with the lower tool 9, the fastener will be brought into contact with the work as shown in FIG. 10. At this point, four additional fastener members are separated from the strip and each located in a separate bore 35, as best shown in FIG. 15. One unseparated fastener member is in a bore 35 at this point of the operation as will also be seen in FIG. 15.

A fastener member now being in sealing position, the air pressure in the cylinders 17 has been brought up to about 20 pounds, and when this pressure is reached, air pressure switch 21 closes. This switch 21 will operate to energize the relay of the main timer 12. At this point it should be noted that the air pressure switch 21 will not energize the relay of the timer 12 unless the operator has removed his or her foot from the foot switch 16.

The main timer 12, which is so constructed that it may be timed to any desired time setting, is now brought into operation by the main timer relay. At the same time, the main timer relay closes contact 47 (FIG. 5), and this in turn energizes the coil of the mercury relay 50.

Mercury relay 50 now operates to close mercury contact 51 (FIG. 5) thereby causing power to flow to the plate transformer primaries of the high frequency generator 10.

When the high frequency generator 10 is supplied with power it in turn will generate high frequency power as will be understood by those skilled in the art. This power is applied to the fastener and the work through the rotating portion 8 and the lower tool 9 by means of suitable conductors 72 and 73 attached to the high frequency generator 10 (FIG. 1). Thus the fastener is heat sealed to the work by heat created within the two while pressed together between the attaching tools.

At the end of the time cycle of the main timer 12, a second relay (not shown but part of the timer assembly) operates to open contact 46 (FIG. 5) thereby de-energizing the mercury relay 50. Contact 51 now opens and stops generation of high frequency power at the work.

A short cooling time, about $1/10$ to $2/10$ of a second is required before the work is released so that the softened plastic may chill and not deform.

At the end of the time cycle of the main timer 12 the second relay (not shown) also closes the contact 45 (at the same time it opens contact 46). Closing contact 45 energizes the time delay timer 48 (FIG. 5) thereby initiating the cooling time period described above. This delay timer is adjustable as will be understood by those skilled in the art. When the cooling period has been completed the time delay timer 48 closes contact 49 which in turn energizes the close coil of the main air solenoid valve 20. Thus air supply is shut off from the compressor 18 and air is released from the air cylinder 17 and the piping 19. The springs in the air cylinder will now operate to raise the rotors 8 and permit the operator to remove the work.

When air pressure drops below 20 pounds, air pressure switch 21 automatically opens. This de-energizes the first mentioned relay of main timer 12 which in turn automatically resets the circuit in preparation for the next cycle.

During the upward movement of the rotating part 8 of the upper head, the pawl 37 is engaged by a pin 39 and as the upward motion continues, the rotor 8 is turned an eighth of a turn to bring the next fastener into applying position. During the rotating operation, the fastener members A and B (FIG. 15) are separated from each other at point C. This separation is caused by a stretching operation due to the fact that the distance D between the centers of the fastener holding bores 35 is greater than the distance E (FIG. 15) between the centers of the fasteners. The stretching distance D is sufficient to cause the fasteners to be separated at their point of connection with each other (at the flanges as shown in FIG. 31). As a safety feature in case the fasteners are not seperated by the stretching action just described, a cutter 54 is mounted on the head 7 (FIGS. 9, 10, 15 and 16). The cutting position is shown in FIGS. 9, 15 and 16 when the rotating head is at the uppermost end of its movement.

Also during the upward movement of the rotor 8 the separated fastener is pushed into position in a bore 35 by the sloping shoulder as best shown in FIG. 15.

Rotation of the rotor 8 also pulls the fastener strip 4 from the reel 3 thereby eliminating any necessity for complicated feeding mechanisms.

The heat control switch 15 is manually operable. When open it permits operation of the machine except that it prevents flow of high frequency power to the attaching members. This is particularly desirable when setting the strip into position through the rotating head 8 preparatory to the first fastener being in the proper position for the first complete cycle of the machine. This also permits intentional operation of the heads without sealing and as an aid in servicing and examination of moving parts for inspection of the machine.

If the operator fails to remove his or her foot from the foot switch 16, the heads of the machine will operate but no further operation of the machine is permitted. This prevents continuous accidental cycling.

If the operator accidentally steps on the foot switch 16 at any point in the cycle the circuit automatically adjusts itself to that point where the work and the fastener are in the heat sealing position regardless of what point the circuit has been operated beyond the heat sealing position. Therefore, when the operator releases the foot switch 16, the cycle is completed from that point on. The circuit is automatically reset by the operation of the main timer mechanism 12.

It will be understood that the apparatus we have described may be one or more sets of attaching tools depending on how many fastener parts are required to be attached during one cycle of the machine. The equipment is adapted to attach all studs, or all sockets, or even a combination of studs and sockets by the use of multiple heads. This will be understood by our description and disclosure of the easily adjustable means formed as part of each rotating head and more specifically described above. One head can be set for studs and another for sockets depending upon the position of the axially sliding pin 53.

Some of the parts of our apparatus (such as the main timer 12, the main air solenoid valve 20, time delay timer 48, and mercury relay 50) have not been shown in detail because they may be standard commercial units and their construction and operation will be understood by anyone skilled in the art of high frequency heat sealing.

Furthermore, the complete showing of the air piping and the wiring of the units in various figures of the drawing has not been attempted because of complicating the drawings. This piping and wiring will be well understood by anyone skilled in the art of attaching equipment and heat sealing.

Between the various figures shown in the drawings and the description above we have disclosed all that is necessary for a person skilled in the art to construct our inventions. It should be understood that we have described a preferred type of apparatus, methods of operation of such apparatus and improved fasteners for operation with such apparatus and methods, but we should not be limited thereby because our inventions are best defined by the following claim.

We claim:

The method of making a continuous strip of plastic snap fastener components for use in automatic snap fastener component applying and sealing equipment comprising molding the plastic snap fastener components as separate, individual pieces, each of said snap fastener components having a thin, heat sealable, plastic flange portion having a substantially flat under surface and a plastic snap fastener portion extending from the opposite surface thereof, placing the individual snap fastener components in hopper means, continuously feeding said fastener components in a continuous line from the hopper means with the flange portion of each in edge to edge contact with the next succeeding component to a sealing zone, applying sealing means to the flange portions of the fastener components as they pass through the sealing zone to heat seal the flange portion of each fastener component to the flange portion of the next succeeding fastener component and to form a severable attaching portion of less width than the flange portion between said flange portions, and continuously withdrawing the formed continuous strip of snap fastener components from the sealing zone.

References Cited in the file of this patent

UNITED STATES PATENTS

| | | |
|---|---|---|
| 2,397,801 | Mitchell | Apr. 2, 1946 |
| 2,709,290 | Rosenthal | May 31, 1955 |
| 2,779,385 | Carlzen et al. | Jan. 29, 1957 |
| 2,790,480 | Lithio | Apr. 30, 1957 |
| 2,796,110 | Dahlberg | June 18, 1957 |